T. CHABRE.
MEASURING INSTRUMENT.
APPLICATION FILED JAN. 5, 1915.
1,168,853.
Patented Jan. 18, 1916.
3 SHEETS—SHEET 1.
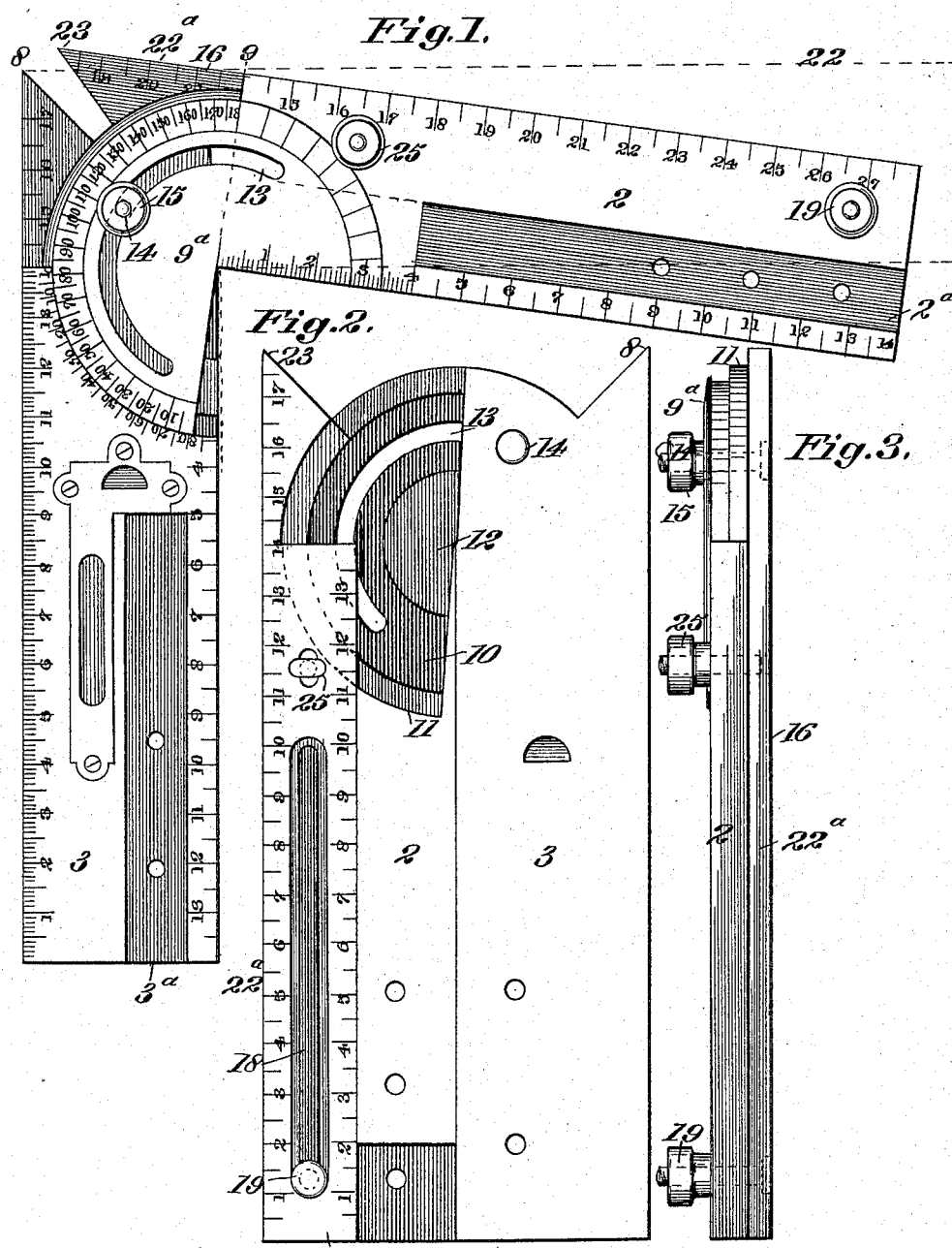
WITNESSES:
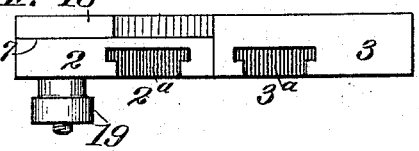
INVENTOR
Theodore Chabre.
BY G. H. Strong.
ATTORNEY

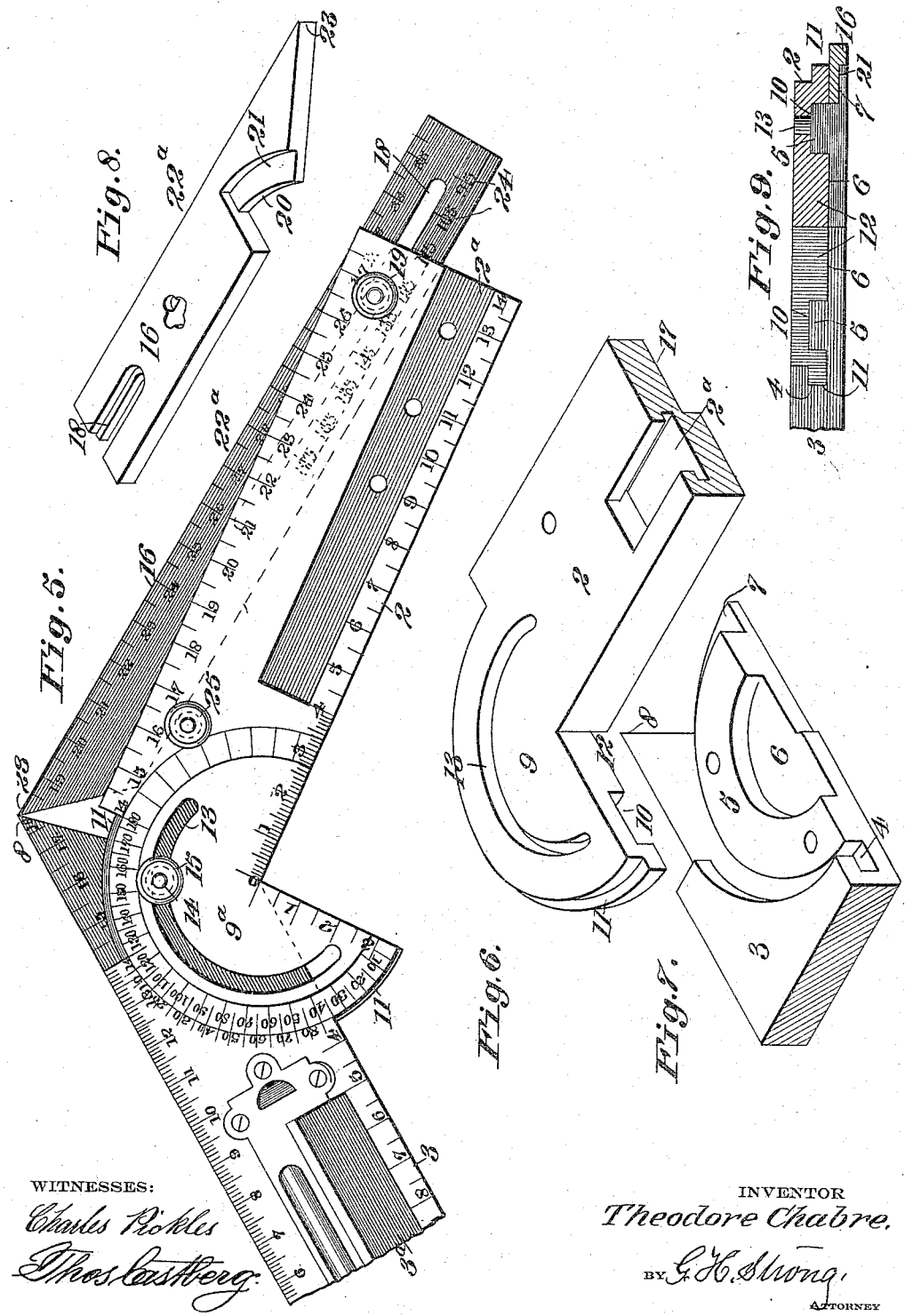

T. CHABRE.
MEASURING INSTRUMENT.
APPLICATION FILED JAN. 5, 1915.
1,168,853.
Patented Jan. 18, 1916.
3 SHEETS—SHEET 3.
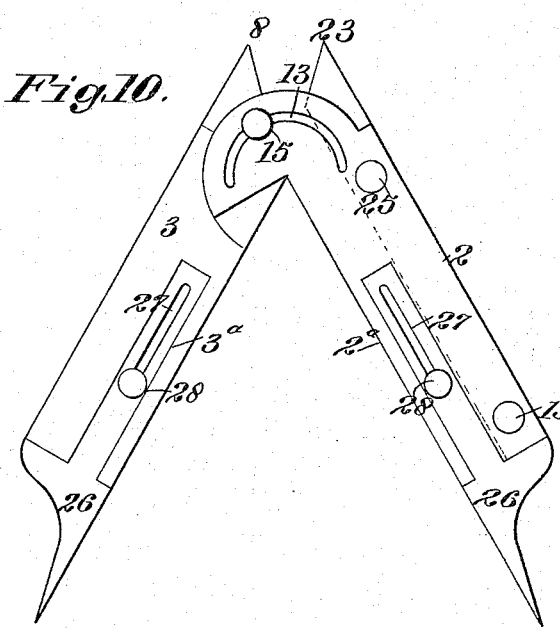
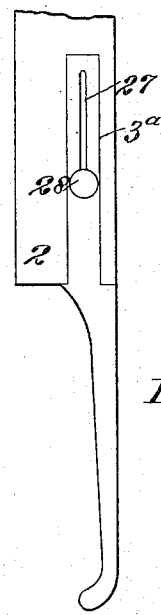
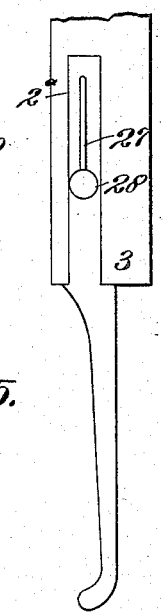
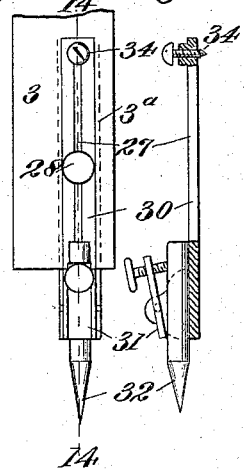
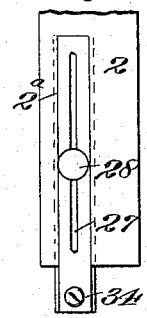
WITNESSES:
Charles Pickles
Thos Castberg
INVENTOR
Theodore Chabre,
BY G. H. Strong,
ATTORNEY

UNITED STATES PATENT OFFICE.

THEODORE CHABRE, OF ALAMEDA, CALIFORNIA.

MEASURING INSTRUMENT.

1,168,853.  Specification of Letters Patent.  Patented Jan. 18, 1916.

Application filed January 5, 1915. Serial No. 618.

*To all whom it may concern:*

Be it known that I, THEODORE CHABRE, a citizen of France, residing at Alameda, in the county of Alameda and State of California, have invented new and useful Improvements in Measuring Instruments, of which the following is a specification.

This invention relates to a measuring instrument.

The object of the present invention is to provide a simple, substantial, easily operated tool or instrument which is so constructed that it may be used and adjusted for various purposes, such as an inside or outside bevel square, an inside or outside caliper, a divider, a compass, a rule, a protractor, a leveler, a T-square or scribe.

The invention consists of the parts and the construction and combination of parts as hereinafter more fully described and claimed, having reference to the accompanying drawings, in which—

Figure 1 is a plan view of the measuring instrument. Fig. 2 is a bottom view of same showing the arms in closed position. Fig. 3 is a side elevation of Fig. 2. Fig. 4 is an end view of Fig. 2. Fig. 5 is a plan view partly broken away of the measuring instrument, showing the rule 16 in use. Fig. 6 is a perspective view of the inner end of arm 2. Fig. 7 is a perspective view of the inner end of arm 3. Fig. 8 is a bottom view and perspective of the inner end of rule 16. Fig. 9 is a section on line 9—9, Fig. 1. Fig. 10 is a plan view showing the application of a pair of divider points. Figs. 11 and 12 show the application of inside and outside caliper points. Fig. 13 is a plan view showing the application of a compass extension bar. Fig. 14 is a longitudinal section on line 14—14, Fig. 13. Fig. 15 shows the use of a scribing point.

The instrument consists, primarily, of a pair of arms 2 and 3 pivotally connected to swing in an arc of 180°. The pivotal connection between the arms is formed in the following manner: One end of arm 3 is provided with a semicircular shaped, rabbeted groove 4, a semicircular-shaped, raised bearing member 5, a semicircular-shaped pocket 6, a recess 7 and a 45° angular extension 8. The function of recess 7 and extension 8 will later be described. Arm 2 is provided with a semicircular extension, generally indicated at 9. Formed on the lower side of said extension is a semicircular-shaped groove 10 which is adapted to receive the bearing member 5, and formed on the outer edge is a flange 11 which is adapted to enter the rabbeted groove 4. Extension 9 is further provided with a semicircular projection 12 which fits into pocket 6 and a semicircular slot 13 through which a threaded stud 14 secured in bearing member 5 projects. A rigid interlocked turret bearing connection is thus formed between the two arms which permits the arms to be swung about a central point to form any desired angle with relation to each other from 0° to 180°. The upper face of extension 9 is provided with a protractor scale 9ª graduated from 0° to 180° which indicates the angular position of the arms, and the arms may be locked in any adjusted position by a clamping nut 15 mounted on stud 14.

The instrument here shown is particularly adapted for measuring outside angles whose total arc measures 90° or less and inside angles whose total arc measures from 90° to 180°. A rule 16 is used in conjunction with arm 3 when measuring these inside angles. This rule is mounted in a recess 17 formed on the lower side of arm 2 which is sufficiently deep to bring the lower face of the rule flush with the lower face of arm 2.

Rule 16 is slotted longitudinally, as indicated at 18, and is secured to arm 2 by a clamp screw 19 which extends through arm 2 and slot 18, thus permitting rule 16 to be adjusted both angularly and longitudinally with relation to arm 2. The inner end of rule 16 is cut on an angle of 45°, and a segmental shaped notch 20 and recess 21 are also provided to permit this end of the rule to enter arm 3, when arms 2 and 3 are positioned at right angles to each other, as indicated by dotted lines 22, Fig. 1, or approximately so, as indicated by full lines in the same figure.

When measuring inside angles which range between 90° and 180° it is accomplished as follows: Arm 3 is first placed on one surface with its inner end reaching the corner. Arm 2 is next swung around until its outer end engages the other surface. Rule 16 is then swung about clamp screw 19 until its outer edge 22ª is flush with said surface. It is then moved longitudinally until its inner point 23 engages with point 8 of arm 3. The angle of the total arc thus secured can now be read on a protractor scale 24 with which rule 16 is provided, the reading being taken at the end of arm 2.

In Fig. 5, which shows the rule set, the reading indicates an arc of 115°. Rule 16 once set is locked in position by clamp screw 19 and arms 2 and 3 by clamp nut 15. When measuring an inside angle whose total arc is less than 90° it is possible to dispense with rule 16 entirely or lock it in parallel alinement with the outer edge of arm 2 by a second clamp nut 25. Fig. 1 shows the position of arms 2 and 3 when measuring an angle of less than 90°. The reading is here taken on the protractor scale 9$^a$ and indicates in this instance an angle whose total arc is 81°.

Arms 2 and 3 are each provided with a dovetailed groove, as indicated at 2$^a$ and 3$^a$. These grooves are provided so that instruments of various kinds may be attached. For instance, in Fig. 10 a pair of divider points 26 are shown as attached; and in Figs. 12 and 13 inside and outside calipers are shown. These various attachments are provided with slotted shank extensions 27 which are inserted into the dovetailed slots, being secured therein by clamp screws 28.

In Figs. 14 and 15 a compass attachment is shown. These consist of slotted bars 30 which are adapted to be inserted in the dovetailed grooves. Each bar is provided with a screw clamp 31, in one of which is secured a pencil 32 and in the other a point. The inner end of the bar shown in Fig. 14 is also provided with a scribing point 34; the bar being only turned end for end when this is used.

From the foregoing description it can be seen that the construction of the instrument is very substantial and that it is easily adjusted for various purposes, and that the several attachments provided enlarge the scope of the instrument and similarly increases its utility without adding materially to the cost.

The materials and finish of the several parts of the apparatus are such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. In a measuring instrument, an arm having an arc-shaped pocket extending through a side of the arm and also having an arc-shaped rabbeted groove one of the ends of which extends through said side of the arm, a raised arc-shaped bearing member disposed in part between the groove and pocket, a second arm having an arc-shaped projection engaged in said pocket and having a groove receiving said bearing member, and a flange on the projection received in said groove.

2. In a measuring instrument, an arm having an arc-shaped rabbeted groove the top of which is open and having a pocket spaced from the groove, and a second arm having an arc-shaped projection the outer end of which projection is insertible in said groove from the outer end of the latter and having a part received in the pocket.

3. In a measuring instrument, a pair of arms and an interlocking arc-shaped turret having spaced inner and outer bearings for pivotally connecting the arms and allowing of the disconnection of the arms by relative turning movement of the arms.

4. In a measuring instrument, a pair of arms one of which has a pocket, a bearing member and a rabbeted groove all of the form of an arc, and a projection, with a groove and a flange on the other arm to engage with the respective parts on the first arm.

5. In a measuring instrument, an arm having an arc-shaped rabbeted groove the top of which is open, an arc-shaped bearing member adjacent the groove, a second arm having a flange received in the groove and having a cut-out part to receive said bearing.

6. In a measuring instrument, an arm having a semi-circular bearing the ends of which terminate substantially at one of the longitudinal sides of the arm, and having an arc-shaped groove one end of which terminates substantially at said side of the arm, and a second arm having a part received in said groove and a part which receives the bearing member.

In testimony whereof I have hereunto set my hand in the presence of two subscribing witnesses.

THEODORE CHABRE.

Witnesses:
JOHN H. HERRING,
W. W. HEALEY.